United States Patent [19]

Hagman.

[11] Patent Number: 4,739,012

[45] Date of Patent: Apr. 19, 1988

[54] ELASTOMER BLENDS

[75] Inventor: John F. Hagman, Wilmington, Del.

[73] Assignee: E. I. Du Pont de Nemours and Company, Wilmington, Del.

[21] Appl. No.: 2,553

[22] Filed: Jan. 21, 1987

Related U.S. Application Data

[63] Continuation-in-part of Ser. No. 831,688, Feb. 21, 1986, abandoned.

[51] Int. Cl.$^4$ .............. C08L 67/02; C08L 23/08; C08L 27/06; C08L 27/08

[52] U.S. Cl. ...................... 525/92; 525/166; 525/173

[58] Field of Search .............. 525/92, 166, 173

[56] References Cited

U.S. PATENT DOCUMENTS

| | | | |
|---|---|---|---|
| 3,203,937 | 8/1965 | Breslow | 525/333.9 |
| 3,718,715 | 2/1973 | Crawford | 525/173 |
| 4,275,180 | 6/1981 | Clarke | 525/173 |

Primary Examiner—Patricia A. Short

[57] ABSTRACT

Blends of 5 to 97.5% of a segmented thermoplastic copolyester such as polybutylene terephthalate containing polybutane glycol segments with 95 to 20% of a blend of an ethylene copolymer and 5 to 75% either polyvinyl chloride or polyvinylidene chloride. The polyethylene copolymer is an elastomeric blend of polyvinyl chloride or polyvinylidene chloride with a copolymer of ethylene and esters of ethylenically unsaturated acids, vinyl esters, vinyl alkyl ethers, vinyl chloride, vinylidene chloride acrylonitrile, methacrylonitrile, norbornene, alpha-olefins of 3–12 carbon atoms and optionally ethylenically unsaturated carboxylic acids, carbon monoxide and sulfur dioxide. The blends are processable temperatures lower than either component they are prepared from.

10 Claims, No Drawings

ELASTOMER BLENDS

CROSS REFERENCE TO RELATED APPLICATION

This application is a continuation-in-part of Ser. No. 831,688, filed Feb. 21, 1986, now abandoned.

BACKGROUND OF THE INVENTION

1. Field of the Invention

The present invention relates to blends of a segmented elastomer having soft polyether segments and hard polyester segments with certain chlorinated polyolefin-ethylene copolymer blend elastomers.

2. Prior Art

U.S. Pat. No. 3,718,715 discloses blends of a segmented elastomer having soft polyether segments and hard polyester segments with polyvinyl chloride.

SUMMARY OF THE INVENTION

The present invention relates to a blend of (A) a segmented elastomer having soft polyether segments and hard polyester segments with (B) an elastomeric blend of polyvinyl chloride or polyvinylidene chloride with a copolymer of ethylene and esters of ethylenically unsaturated acids, vinyl esters, vinyl alkyl ethers, vinyl chloride, vinylidene chloride, acrylonitrile, methacrylonitrile, norbornene, alpha-olefins of 3-12 carbon atoms and optionally ethylenically unsaturated carboxylic acids, carbon monoxide and sulfur dioxide. The blends are processable at temperatures lower than either component (A) or (B).

DETAILED DESCRIPTION

The present invention relates to a thermoplastic elastomeric blend having a lowered melt processing temperature comprising (A) from 5 to 97.5 weight percent and perferably from 5 to 80 weight percent of a segmented thermoplastic copolyester composition consisting essentially of a multiplicity of recurring long-chain ester units and short-chain ester units joined head-to-tail through ester linkages, said long-chain ester units being represented by the formula

  I and said short-chain units being represented by the formula

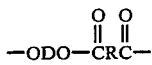  II where G is a divalent radical remaining after the removal of terminal hydroxyl groups from a poly-(alkylene oxide) glycol having a molecular weight of about 400-6,000 and a carbon to oxygen ratio of about 2.0-4.3; R is a divalent radical remaining after removal of carboxyl groups from a dicarboxylic acid having a molecular weight less than about 300 and D is a divalent radical remaining after removal of hydroxyl groups from a diol having a molecular weight less than about 250; provided said short-chain ester units amount to about 15 to 95 percent by weight of said copolyester, and at least about 50 percent of said short-chain ester units are identical and (B) from 2.5 to 95 weight percent and preferably from 20 to 95 weight percent of a partially crosslinked, thermoplastic, melt-processible, elastomeric blend of (a) a copolymer of ethylene and one or more ethylenically unsaturated organic comonomers selected from the class consisting of esters of ethylenically unsaturated $C_3$-$C_{20}$ mono- or dicarboxylic acids, vinyl esters of saturated $C_2$-$C_{18}$ carboxylic acids, vinyl alkyl ethers wherein the alkyl group has 1-18 carbon atoms, vinyl or vinylidene halides, acrylonitrile, methacrylonitrile, norbornene, alpha-olefins of 3-12 carbon atoms, and vinyl aromatic compounds and optionally an additional monomer selected from the class consisting of ethylenically unsaturated $C_3$-$C_{20}$ carboxylic acids, carbon monoxide and sulfur dioxide; and (b) between 5 and 75 weight percent, based on the composition, of a vinyl or vinylidene halide polymer wherein the comonomer content in (a) is such that the ethylene copolymer is compatible with the vinyl or vinylidene halide polymer.

The ethylene copolymers useful as "B"(a) above can be represented as having the formula E/X/Y, where X is an ethylenically unsaturated organic monomer other than an unsaturated carboxylic acid, and Y is optional and is an ethylenically unsaturated carboxylic acid, carbon monoxide, or sulfur dioxide. Exemplary of the organic monomers are those selected from the group consisting of esters of said unsaturated mono- or dicarboxylic acids, vinyl esters of saturated carboxylic acids where the acid group has 2-18 carbon atoms, vinyl alkyl ethers wherein the alkyl group has 1-18 carbon atoms, vinyl or vinylidene halides, acrylonitrile, methacrylonitrile, norbornene, alpha-olefins of 3-12 carbon atoms, and vinyl aromatic compounds. Preferred organic monomers include methyl acrylate, butyl acrylate and vinyl acetate. The melt index range for these copolymers is 0.1 to 1000 (ASTM D-1238), preferably 1 to 100.

The ethylene copolymers useful in the practice of the subject invention need have sufficient comonomer copolymerized therein to exhibit compatability with the vinyl and vinylidene chloride polymers described below. Generally speaking, the ethylene content in these polymers should be 30 to 85 percent, the X monomer content 1 to 70 percent, and the Y monomer content up to 30 percent, all based on polymer weight. When an ethylene copolymer is used which is not sufficiently compatible with the vinyl or vinylidene polymers, shaped articles molded from the blends are opaque, show stress whitening when stretched and lack the required recovery to be considered elastomeric. A more detailed discussion of the compatability of these ethylene copolymers with vinyl and vinylidene chloride polymers, as well as a discussion of the preparation of the copolymers can be found in *Polymer-Polymer Miscibility*. O. Olabisi, L. M. Robeson and M. T. Shaw, Academic Press, N.Y., N.Y., 1979, U.S. Pat. Nos. 3,684,778 and 3,780,140, all herein incorporated by reference.

The ethylene copolymers described above are blended in accordance with the subject invention with 5 to 75, preferably 20 to 60, weight percent based on the blended composition of vinyl or vinylidene halide polymers including copolymers resulting from copolymerization with a comonomer selected from the group consisting of vinyl esters, acrylonitrile, vinylidene chloride, vinyl chloride, esters of unsaturated carboxylic acids such as acrylic acid and vinyl ethers. For example, polyvinyl chloride having an inherent viscosity of 0.30 to 1.4 (ASTM D-1243) is generally useful in the practice of the subject invention.

The blending of the ethylene copolymer with the vinyl or vinylidene halide polymer is accomplished by any one of a number of conventional techniques, for example, in an internal mixer, two-roll mill or extruder. This blending is done at a temperature high enough to soften the polymers for adequate blending, but not so high as to degrade either halide polymer. Generally speaking this blending temperature ranges from 130± to 200° C., and blending is carried out for a time sufficient to homogeneously blend the components.

The critical aspect of the subject invention is the partial crosslinking of the ethylene copolymer in the compatible blend. This can be carried out using any one or more of the well known crosslinking techniques including but not limited to electron beam irradiation, gamma irradiation and free radical curatives such as peroxides. The crosslinking of the ethylene copolymer according to this invention can be carried out before or concurrently with blending with the vinyl or vinylidene halide polymers, or after such blending when using radiation techniques to effectuate the crosslinking. If the ethylene copolymer in the blend contains carbon monoxide, diamines such as methylene dianiline or p-phenylene diamine can be used to effectuate the desired crosslinking. If the ethylene copolymer is ethylene/vinyl acetate/carbon monoxide, sulfur vulcanizing agents can be used as detailed in U.S. Pat. No. 4,172,939. For crosslinking ethylene copolymers containing carboxylic acid functionalities, the formation of ionic crosslinks is suitable in the practice of the subject invention, and is achieved with various metal oxides or hydroxides such as ZnO and NaOH, or with organometallics such as chromium acetylacetone, as detailed in U.S. Pat. No. 4,304,887.

The term "partially crosslinked" refers to a degree of crosslinking sufficient to transform a blend of an ethylene copolymer as detailed above and a vinyl or vinylidene halide polymer into the thermoplastic elastomeric blends of the subject invention. To quantify the degree of crosslinking, the amount of insoluble, and hence crosslinked, polymer is determined by extracting a sample of the polymer, after crosslinking, with tetrahydrofuran in a Soxhlet extractor for 16 hours, isolating the insoluble portion and weighing the dried residue, making suitable corrections based upon knowledge of the composition. For example, the weight of components soluble in tetrahydrofuran such as plasticizers are subtracted from the initial weight; and components insoluble in tetrahydrofuran, such as pigments, fillers, etc. are subtracted from both the initial and final weight. The insoluble polymer recovered is reported as percent gel content. This procedure is based on a conventional procedure for quantifying degree of crosslinking that is more fully detailed in U.S. Pat. No. 3,203,937. For purposes of the subject invention, the ethylene copolymer should be partially crosslinked so that they have a gel content of 5 to 90 percent, based on the ethylene copolymer. The conditions under which this crosslinking is carried out, i.e., type and quantity of crosslinking agent, crosslinking time and temperature, to arrive at a composition having a gel content within this operable range, can be determined empirically. When chemical crosslinking agents are utilized, it is preferable that they be substantially totally consumed during the crosslinking step.

When polyvinyl chloride (PVC) is utilized as the vinyl halide polymer in the practice of the subject invention, spectroscopic evidence indicates that the gel fractions isolated from those partially crosslinked polymer blends contain only crosslinked ethylene copolymer, with no detectable PVC present. It is theorized, therefore, that essentially no crosslinking of the PVC occurs.

The thermoplastic copolyester which is used in the instant invention consists essentially of a multiplicity of recurring intralinear long-chain and short-chain ester units connected head-to-tail through ester linkages, said long-chain ester units being represented by the following structure:

(a)

and said short-chain ester units being represented by the formula

(b)

wherein:
G is a divalent radical remaining after removal of terminal hydroxyl groups from poly(alkylene oxide) glycols having a carbon-to-oxygen ratio of about 2.0–4.3 and molecular weight between about 400 and 6,000.
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250,
with the provisos that the short-chain ester units constitute about 15–95 percent by weight of the copolyester and, ergo, the long-chain ester units constitute about 5 to 85 percent by weight of the copolyester, at least about 50 percent of the short-chain ester units must be identical and a homopolymer in the fiber-forming molecular weight range ( 5,000) consisting of the identical short-chain ester units must melt at, at least, 150° C.

The term "long-chain ester units" as applied to units in a polymer chain refers to the reaction product of a long-chain glycol with a dicarboxylic acid. Such "long-chain ester units", which are a repeating unit in the copolyesters of this invention, correspond to formula (a) above. The long-chain glycols are polymeric glycols having terminal (or as nearly terminal as possible) hydroxy groups and a molecular weight from about 400–6,000. The long-chain glycols used to prepare the copolyesters of this invention are poly(alkylene oxide) glycols having a carbon-to-oxygen ratio of about 2.0–4.3.

Representative long-chain glycols are poly(ethylene oxide) glycol, poly(12- and 1,3-propylene oxide) glycol, poly(tetramethylene oxide) glycol, random or block copolymers of ethylene oxide and 1,2-propylene oxide, and random or block copolymers of tetrahydrofuran with minor amounts of a second monomer such as 3-methyltetrahydrofuran (used in proportions such that the carbon-to-oxygen mole ratio in the glycol does not exceed about 4.3).

The term "short-chain ester units" as applied to units in a polymer chain refers to low molecular weight compounds or polymer chain units having molecular weight less than about 550. They are made by reacting a low molecular weight (below about 250) diol or diols with a dicarboxylic acid to form ester units represented by formula (b) above.

Included among the low molecular weight diols which react to form short-chain ester units are acyclic, alicyclic, and aromatic dihydroxy compounds. Preferred are diols with 2-15 carbon atoms such as ethylene, propylene, tetramethylene, pentamethylene, 1,4-butene, 2,2,dimethyltrimethylene, hexamethylene, and decamethylene glycols, dihydroxy cyclohexane, cyclohexane dimethanol, resorcinol, hydroquinone, 1,5-dihydroxy naphthalene, and mixtures thereof, etc. Especially preferred are aliphatic diols containing 2-8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, such as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —$SO_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis(cyclohexane carboxylic acid), 3,4-furan dicarboxylic acid, and 1,1-cyclobutane dicarboxylic acid. Preferred aliphatic and cycloaliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, 1,5-naphthalene dicarboxylic acid, 2,6-naphthalene dicarboxylic acid, 2,7-naphthalene dicarboxylic acid, phenanthrene dicarboxylic acids, anthracene dicarboxylic acids, 4,4'-sulfonyl dibenzoic acid, and $C_1$-$C_{12}$ alkyl and ring substitution derivatives thereof, such as halo, alkoxy, and aryl derivatives. Hydroxyl acids such as p($\pm$-hydroxyethoxy) benzoic acid can also be used providing an aromatic dicarboxylic acid is also present.

Aromatic dicarboxylic acids are an especially preferred class for preparing the copolyetherester polymers of this invention. Among the aromatic acids, those with 8-16 carbon atoms are preferred, particularly the phenylene dicarboxylic acids, i.e., phthalic, terephthalic and isophthalic acids and their dimethyl derivatives.

It is essential that at least about 50 percent of the short segments are identical and that the identical segments form a homopolymer in the fiber-forming molecular weight range (molecular weight 5,000) having a melting point of 150° C. or higher. Polymers meeting these requirements exhibit a useful level of properties such as tensile strength and tear strength. Polymer melting points are conveniently determined by differential scanning calorimetry.

The short-chain ester units will constitute about 15-95 weight percent of the copolyesters. The remainder of the copolyester will be the long segments, ergo the long segment will comprise about 5-85 weight percent of the copolyester.

Generally, the composition will contain from 5 to 80 weight percent based on the total polymeric composition of the segmented thermoplastic copolyester and 95 to 20 weight percent of the total polymeric composition of the blend of polyvinyl chloride or polyvinylidene chloride with the ethylene copolymer.

The composition of this invention can be prepared by blending components A and B in a suitable mixer such as an internal mixer, a twin-screw extruder, or a 2-roll mill. Alternatively the composition can be prepared by blending Component A, the ethylene copolymer, and the vinyl or vinylidene halide polymer in the presence of a crosslinking agent in a suitable mixer such as a twin-screw extruder, an internal mixer, or a 2-roll mill. Furthermore the composition can also be prepared by crosslinking the ethylene copolymer with a suitable crosslinking agent and then blending the crosslinked ethylene copolymer with Component A and the vinyl or vinylidene halide polymer.

Starting at about the 5 weight percent segmented thermoplastic copolymer level the melt processability is significantly improved and the temperature required to process the composition is lowered; and the mold shrinkage becomes significantly reduced. The improved melt flow reduced the dependence on shear for fluidity which is important when injecting multicavity, molds or thin section cavities.

When modifying the segmented thermoplastic copolymer with the blend of a copolymer of ethylene with either polyvinyl chloride or polyvinylidene chloride, an improvement in blow moldability is obtained. This improvement manifests itself with an improvement in part definition, elimination of voids and cracks and an improvement in regularity of wall thickness. This improvement begins to be apparent at 2½% level and is quite apparent at the 5% level ethylene copolymer blend with either polyvinyl chloride or polyvinylidene chloride.

While the composition has been described as a blend of a polyether ester with a blend of a copolymer of ethylene and either polyvinyl chloride or polyvinylidene chloride, it is to be understood that the various individual components can be added in any order that so long as they constitute the overall amounts in a blend recited in the claims it is intended that such composition is within the scope of the claims.

Although not essential components of the composition of this invention, various amounts of any number of conventional fillers or compounding ingredients may be admixed. Examples of such ingredients include various carbon blacks, clays, silica, alumina, calcium carbonate, titanium dioxide, glass fibers, antioxidants, antidegradants, tackifiers, processing aids such as lubricants and waxes, and plasticizers such as dialkylphthalates, trialkylmellitates, dialkyl esters such as dialkyl adipates, azeleates and glutarates, and polyester oligomers. The amounts used depend, at least in part, upon the quantities of other ingredients in the composition and the properties desired from the composition. Also, minor amounts of other saturated and unsaturated polymers such as alpha-olefins may be added to reduce the cost or modify the properties of the composition.

The compositions of the subject invention are melt processible using conventional plastic processing equipment. Articles molded from the unique thermoplastic elastomeric compositions of the subject invention exhibit properties generally only associated with vulcanized rubber. For example, these compositions have resistance to compression set values of about 20 to 85 percent (70° to 100° C.); and elongation at break values of 150 to 850 percent. Various uses for these compositions include wire coverings, seals, gaskets and weather strippings, molded seals, footwear components; caulks and sealants; automotive parts, sheet liners, foams, sponges and packaging films. They can be used to coat fabric, industrial belts and various hard surfaces by extrusion coating, for example, polyester, polyamide, polyimide or metal fibre or fabric reinforcement. They find utility in adhesive and sealant applications, as well as for modification of other polymer systems.

Further, compositions within the scope of this invention can be fabricated into tubing for laboratory, medical and industrial uses. Such tubing can also be used as the inner tube of reinforced hoses, wherein the extruded tube is overlaid with wire or textile cords, applied as a spiral, knit or braid. Optionally, a polymeric covering may be applied (extruded or spiral wound calendered sheet) over the reinforced tubing to provide protection from the working environment and mechanical abuse. Compositions within the scope of this invention can be used as the protective covering of reinforced tubes of similar or different composition.

The subject invention will be more fully appreciated with reference to the examples that follow:

EXAMPLES

EXAMPLE I

A series of blends of Polymer 1, a partially cross-linked blend of polyvinyl chloride of inherent viscosity 1.4 as measured (by ASTM Method D1243-79) in a 0.2% solution in cyclohexanone (49 parts) containing a stabilizer package, a copolymer containing 60% ethylene, 30% butyl acrylate, and 10% carbon monoxide (45 parts), and a peroxide crosslinking agent (6 parts), compound with carbon black, dialkyl ester plasticizer, polyester plasticizer, and stabilizer, prepared in an internal mixer, and Polymer 2, polyetherester elastomer of melt index 5, composing of 37.5% short chain unit derived from 1,4-butanediol and terephthalic acid, 10.9% short chain unit derived from 1,4-butanediol and isoterephthalic acid, and 51.5% long chain unit derived from polytetramethylene ether glycol of molecular weight 1000 and terephthalic acid, are prepared by blending in an internal sigma blade mixer at 175° C. for 2 minutes, the two polymers in the amounts reported in the Table below. The shrinkage was measured on 2 mm thick slabs which were compression molded at 175° C. for two minutes. The melt flow index is reported as decigrams per minute using a 10 Kg weight at 190° C. (ASTM D1238).

TABLE I

|  | A | B | C | D | E |
|---|---|---|---|---|---|
| Polymer 1 % | 100 | 97.2 | 95 | 90 | 80 |
| Polymer 2 % | 0 | 2.5 | 5 | 10 | 20 |
| Gafac RL-210 | 1.0 | 1.0 | 1.0 | 1.0 | 1.0 |
| Melt Flow | 0.08 | 0.12 | 0.22 | 0.67 | 2.01 |
| Shrinkage % (length) | 3.1 | 2.5 | 2.3 | 2.1 | 1.3 |
| Shrinkage % (width) | 2.3 | 2.3 | 1.7 | 1.3 | 1.4 |
| Mooney Viscosity (MS) at 325° F. (163° C.) minimum value | 12.5 | 12 | 11 | 9 | 6.5 |
| Mooney Viscosity (MS) at 350° F. (175° C.) minimum value | 10.5 | 10 | 8.5 | 7 | 4.5 |

Gafac RL-210 is a complex organic phosphate ester free acid.

As can be seen from Table I the addition of Polymer B gives an improvement in mold shrinkage and in melt flow (improved processability).

EXAMPLE II

A pair of control blends were prepared.

(F) Polyvinyl chloride having an inherent viscosity of 1.4 as measured from a 0.2% solution in cyclohexane (80 parts) and Polymer 2 from Example I were charged into a Farrel banbury mixer size BR with a chamber volume of 96 cubic inches (1573 cc) at room temperature. The speed of the mixer was adjusted so that the internal friction brought the internal temperature to 177° C., a release agent Gafac RL-210 (0.5 part) was added and mixed at 177° C. for two minutes. The mixture was dumped immediately. The product was sheeted out on a two roll mill at 150° C. It could not be processed at a lower temperature.

(G) Polymer 1 from Example 1 was blended with Gafac RL-210 (0.5 part) using the procedure described in (F) above. The composition also had to be sheeted off the mill at 150° C.

EXAMPLE III (H) The blend used in G above (80 parts), and Polymer 2 from Example I (20 parts) were mixed as in (F) above. The product was sheeted out on a two-roll mill at 120° C. This shows a clear improvement in processability.

EXAMPLE IV (I) The blend used in (G) above (80 parts), a polyetherester elastomer of melt index 8, composing of 45.6% short chain unit derived from 1,4-butanediol and terephthalic acid, 30.4% short chain unit derived from 1,6-hexanediol and terephthalic acid, and 24.0% long chain unit derived from polytetramethylene ether glycol of molecular weight 1000 and terephthalic acid, having a melt flow at 190° C. of 42, a tensile strength of 17 MPa, an ultimate elongation of 390% and a compression set after 22 hours at 100° C. of 76% (20 parts) and Gafac RL-210 (0.5 part) were mixed as in (F) above. It was sheeted out on a two roll mill at 120° C.

EXAMPLE V (J) A copolymer of 60 wt. % ethylene, 30 wt. % butyl acrylate and 10 wt. % carbon monoxide having a melt index of 5 (45 parts), polyvinyl chloride having an inherent viscosity of 1.4 as measured from a 0.2% solution in cyclohexane (51 parts) containing a stabilizing package and peroxide crosslinking agent (3.5 parts) were mixed in a 30 mm twin screw extruder using a barrel temperature of 135° C. to 140° C. at a production rate of 30 lb/hr (13.6 kg/hr). Gafac RL-210 (0.5 part) was added to the product at 140° C. on a two roll mill. The copolymer had a gel content of 85%.

(K) Polymer (J) above (80 parts) was mixed with Polymer 2 from Example 1 (20 parts) as described in (F) above.

Composition (K) requires a lower milling temperature than (J) does, (K) has a higher melt index, lower Mooney viscosity, and less mold shrinkage by as much as 50%, while maintaining good elastomeric properties.

EXAMPLE VI (L) a copolymer of 62 wt. % ethylene, 28 wt. % vinyl acetate and 10 wt. % carbon monoxide having a melt index of 25 (45 parts), polyvinyl chloride having an inherent viscosity of 1.4 as measured from a 0.2% solution in cyclohexane (51 parts) and peroxide crosslinking agent (3.5 parts) were mixed in a 30 mm twin screw extruder as in (J). Gafac RL-210 (0.5 part) was added to the product at 140° C. on a two roll mill. The copolymer had a gel content of 75%.

(M) Polymer (L) above (80 parts) was mixed with Polymer 2 from Example 1 (20 parts) as described in (F) above including Gafac RL-210 (0.5 part).

(N) Polymer (L) above (40 parts) was mixed with Polymer 2 from Example 1 (60 parts) as described in (F) above including 0.5 part Gafac RL-210.

Increase in melt flow, decrease in Mooney viscosity, reduction in mold shrinkage and processing temperature are again observed for (M) and (N) as compared to (L).

EXAMPLE VII (O) Vamac an ethylene/acrylic elastomer of Mooney viscosity 16 at 100° C., composing of 41% ethylene, 55% methyl acrylate, and 4% maleic acid monoethyl ester (parts), 51 parts of polyvinyl chloride having an inherent viscosity of 1.4 as measured from a 0.2% solution in cyclohexane containing stabilizers, 0.5 part Gafac RL-210, and 3.5 parts of peroxide crosslinking agent are blended in a Haake internal mixer using banbury blades at 140° C. and a speed of 40 rpm. The composition had a gel content of 80%.

(P) (O) above (80 parts) and Polymer 2 from Example 1 (20 parts) were mixed as described in (F) above.

The physical properties of the compositions used and prepared in Examples II to VII are reported in Table II.

TABLE II

| Polymer | F | G | H | I | J | K | L | M | N | O | P | Polymer 2 |
|---|---|---|---|---|---|---|---|---|---|---|---|---|
| Mill Temp. °C. | 150 | 150 | 120 | 120 | 140 | 120 | 140 | 120 | 120 | 120 | 110 | — |
| Melt Flow, 190° C. | NF[1] | 0.11 | 3.66 | 1.24 | NF[1] | 0.18 | NF[1] | 0.9 | 15 | 0.06 | 0.20 | 29 |
| Mooney Viscosity | | | | | | | | | | | | |
| 150° C. min. value | 35 | 37 | 35 | 35 | 94 | 29 | 109 | 29 | 29 | 45 | 50 | — |
| 177° C. min. value | 59 | 20 | 10 | 13 | 73 | 31 | 75 | 30 | 5 | 37 | 32 | — |
| Mold Shrinkage[2] Composition, % | 0.2 | 2.0 | 1.0 | 0.7 | 1.5 | 0.8 | 1.7 | 1.0 | 1.0 | 0.5 | 0 | — |
| Tensile Strength, MPa | 23 | 13 | 13 | 12 | 19 | 17 | 18 | 19 | 19 | 7 | 12 | 21 |
| Ultimate Elongation, % | 220 | 300 | 300 | 280 | 310 | 340 | 290 | 340 | 460 | 160 | 270 | 850 |
| Compression Set 100° C. for 22 hours, % | 75 | 37 | 55 | 65 | 49 | 57 | 33 | 64 | 78 | 63 | 83 | 91 |

[1]NF equals no flow
[2]Compression Molded Linear shrinkage

EXAMPLE VIII

Table III reports a series of blends containing 80–100 parts of the polymer used in (G) above, 0–20 Polymer 2 from Example I and 1 part Gafac RL-210 prepared in a 3D Banbury internal mixer according to the procedure described for (F) above.

With increasing higher polyester-ether content, the Mooney viscosity drops shrinkages for both compression and injection molded plaques are improved and appearance of extruded articles improves.

TABLE III

| Composition | R | S | T | U |
|---|---|---|---|---|
| Polymer 1 | 100 | 90 | 85 | 80 |
| Polymer 2 | — | 10 | 15 | 20 |
| Gafac RL-210 | — | 1 | 1 | 1 |
| Mooney Viscosity | | | | |
| 177° C., min. value | 16 | 9 | 7 | 6 |
| Shrinkage, As Molded, % | | | | |
| by Compression Mold Method | 3.7 | 1.8 | 2.2 | 2.0 |
| by Injection Mold Method | 6.6 | 4.5 | 3.5 | 3.1 |
| Shrinkage, After 1 Hr. at 125° C., % | | | | |
| by Compression Mold Method | 8.9 | 6.2 | 4.2 | 4.2 |
| by Injection Mold Method | 17.5 | 11.2 | 8.7 | 8.1 |
| Appearance of Extruded Articles | | | | |
| Smoothness | sm.* | v. sm.* | v. sm.* | v. sm.* |
| Profile Sharpness | rough | fair | good | good |
| Tensile Strength, MPa | 15 | 15 | 15 | 15 |
| Ultimate Elongation, % | 300 | 360 | 390 | 390 |
| Compression Set, 100° C. for 22 hours, % | 51 | 57 | 56 | 58 |

*sm. equals smooth
v. sm. equals very smooth

EXAMPLE IX

Table IV reports a series of compositions containing 0–100 parts of a partially crosslinked blend of polyvinyl chloride of inherent viscosity 1.04 as measured (by ASTM Method D1243-79) in a 0.2% solution in cyclohexanone (51.5 parts) containing a stabilizer package, a copolymer containing 60% ethylene, 30% butyl acrylate, and 10% carbon monoxide (45 parts), and a peroxide crosslinking agent (3.5 parts), compound with carbon black, dialkyl ester plasticizer, polyester plasticizer, and stabilizer, prepared in an internal mixer, (Polymer 3) 0–100 parts of Polymer 2 from Example I and 0.5 part Gafac RL-210 prepared in a OOC Banbury internal mixer according to the procedure described in (F) above.

The viscosities and processing temperatures of the blends are lower than those of either starting material.

TABLE IV

| Composition | V | W | X | Y | Z |
|---|---|---|---|---|---|
| Polymer 3 | 100 | 75 | 50 | 25 | — |
| Polymer 2 | — | 25 | 50 | 75 | 100 |
| Gafac RL-210 | — | 0.5 | 0.5 | 0.5 | — |
| Processing Temp, °C. | 160 | 150 | 150 | 135 | 160 |
| Mooney Viscosity 150° C., min. value | 22 | — | 15 | — | 200 |
| Mooney Viscosity 177° C., min. value | 14 | 5 | 3 | 2 | — |
| Tensile Strength, MPa | 12 | 12 | 13 | 16 | 21 |
| Ultimate Elongation, % | 285 | 255 | 610 | 820 | 850 |
| Compression Set, 100° C. for 22 hours, % | 59 | 69 | 71 | 72 | 91 |

EXAMPLE X

A blend of 5 weight percent of Polymer 1 from Example I and 95 weight percent of Polymer 2 from Example I is prepared as described in Example I. The properties of the blend are reported in Table V.

In a related experiment, Polymer 2 could not be extrusion blow molded into acceptable parts due to poor part definition, voids, cracks and irregular wall thickness. When 2.5% of Polymer 2 was added the wall thickness became uniform. When 5% of Polymer 2 was added as in this Example, excellent parts were obtained.

TABLE V

| | |
|---|---|
| $M_{100}$, MPa | 1.4 |
| $M_{200}$, MPa | 9.0 |
| $T_B$, MPa | 23.1 |
| $E_B$, % | 780 |
| P.S., % | 320 |
| P.S./$E_B$, % | 41 |
| Comp. Set, 100° C./22 Hrs. % | 74 |
| Hardness A, initial | 85 |
| A, 6 sec. | 84 |
| D, initial | 32 |
| D, 6 sec. | 30 |
| Melt Index, 190° C./10 kg g/10 min. | 43.4 |
| Mold Shrinkage | |
| Length, % | 1.0 |
| Width, % | 1.2 |
| Mooney Viscosity, 177° C. min. value | 1 |

I claim:

1. A thermoplastic elastomeric blend having a lowered melt processing temperature comprising:
(A) from 5 to 97.5 weight percent of a segmented thermoplastic copolyester composition consisting essentially of a multiplicity of recurring long-chain ester units and short-chain ester units joined head-to-tail through ester linkages, said long chain ester units being represented by the formula

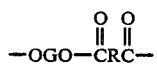

$$-\text{OGO}-\overset{\overset{\text{O}}{\|}}{\text{C}}\text{R}\overset{\overset{\text{O}}{\|}}{\text{C}}- \qquad \text{I}$$

and said short-chain units being represented by the formula

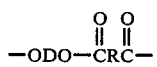

$$-\text{ODO}-\overset{\overset{\text{O}}{\|}}{\text{C}}\text{R}\overset{\overset{\text{O}}{\|}}{\text{C}}- \qquad \text{II}$$

where G is a divalent radical remaining after the removal of terminal hydroxyl groups from a poly- (alkylene oxide) glycol having a molecular weight of about 400–6,000 and a carbon to oxygen ratio of about 2.0–4.3; R is a divalent radical remaining after removal of carboxyl groups from one or more dicarboxylic acids having molecular weights less than about 300 and D is a divalent radical remaining after removal of hydroxyl groups from one or more diols having a molecular weight less than about 250; provided said short-chain ester units amount to about 15–95 percent by weight of said copolyester, and at least about 50 percent of said short-chain ester units are identical and (B) from 2.5 to 95 weight percent of a partially crosslinked, thermoplastic, melt-processable, elastomeric blend of
  (a) a copolymer of 30 to 85 weight percent repeating units derived from ethylene and the remainder repeating units derived from one or more ethylenically unsaturated organic comonomers selected from the class consisting of esters of ethylenically unsaturated $C_3$–$C_{20}$ mono- or dicarboxylic acids, vinyl esters of saturated $C_2$–$C_{18}$ carboxylic acids, vinyl alkyl ethers wherein the alkyl group has 1–8 carbon atoms, acrylonitrile, methacrylonitrile, norbornene, alpha-olefins of 3–12 carbon atoms, and vinyl aromatic compounds, and optionally up to 30 weight percent of an additional monomer selected from the class consisting of ethylenically unsaturated $C_3$–$C_{20}$ carboxylic acids, carbon monoxide and sulfur dioxide; and
  (b) between 5 and 75 weight percent, based on composition (B), of a vinyl or vinylidene halide homopolymer or coolymer with a monomer selected from the group consisting of vinyl esters, acrylonitrile, esters of unsaturated carboxylic acids and vinyl ethers, wherein the comonomer content in (a) is such that the ethylene copolymer is compatible with the vinyl or vinylidene halide polymer.

2. The composition of claim 1 wherein Component A comprises from 5 to 80 weight percent of the composition and Component B comprises from 20 to 95 weight percent of the composition.

3. The blend of claim 2 wherein Component (B)(a) has a gel content of 10 to 90 percent.

4. The blend of claim 3 wherein (B)(b) is polyvinyl chloride.

5. The blend of claim 4 wherein the organic comonomers other than carbon monoxide, sulfur dioxide or ethylenically unsaturated carboxylic acid in (B)(a) are selected from the group consisting of methyl acrylate, butyl acrylate, vinyl acetate and maleic acid monoethyl ester.

6. The blend of claim 5 wherein up to 30 weight percent of the conomoner carbon monoxide, sulfur dioxide or an ethylenically unsaturated carboxylic acid and at least one percent of the monomers recited in claim 5 is present.

7. The composition of claim 6 wherein R is derived from dicarboxylic acids selected from the group consisting of phthalic acid, terephthalic acid, isophthalic acid, their esters and mixtures thereof.

8. The composition of claim 7 wherein the poly(alkylene oxide) glycol is poly(tetramethylene oxide) glycol having a molecular weight of about 600–2,000.

9. The composition of claim 8 wherein said diol is 1,4-butanediol.

10. A shaped article formed of the composition of claim 1.

* * * * *

UNITED STATES PATENT AND TRADEMARK OFFICE
CERTIFICATE OF CORRECTION

PATENT NO. : 4,739,012

DATED : April 19, 1988

INVENTOR(S) : John Francis Hagman

It is certified that error appears in the above-identified patent and that said Letters Patent is hereby corrected as shown below:

In Claim 1, column 13, line 24, "1-8 carbon atoms" should read --1-18 carbon atoms--.

In Claim 1, column 13, line 34, "coolymer" should read --copolymer--.

Signed and Sealed this

Seventh Day of March, 1989

Attest:

DONALD J. QUIGG

*Attesting Officer*  *Commissioner of Patents and Trademarks*